United States Patent
Wright et al.

(10) Patent No.: US 11,788,485 B2
(45) Date of Patent: *Oct. 17, 2023

(54) FUEL SYSTEM TEST APPARATUS AND METHOD

(71) Applicant: Transportation IP Holdings, LLC, Norwalk, CT (US)

(72) Inventors: David Wright, Decatur, TX (US); David Baldwin, Erie, PA (US)

(73) Assignee: Transportation IP Holdings, LLC, Norwalk, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 17/702,919

(22) Filed: Mar. 24, 2022

(65) Prior Publication Data

US 2022/0220918 A1  Jul. 14, 2022

Related U.S. Application Data

(63) Continuation-in-part of application No. 16/512,049, filed on Jul. 15, 2019, now Pat. No. 11,313,305.

(51) Int. Cl.
| | |
|---|---|
| *G06F 1/00* | (2006.01) |
| *F02D 41/22* | (2006.01) |
| *F02D 41/24* | (2006.01) |
| *G01M 3/32* | (2006.01) |

(52) U.S. Cl.
CPC ......... *F02D 41/22* (2013.01); *F02D 41/2422* (2013.01); *G01M 3/3209* (2013.01); *G01M 3/3263* (2013.01); *F02D 2041/225* (2013.01); *F02D 2200/0602* (2013.01)

(58) Field of Classification Search
CPC .............. F02D 19/025; F02D 19/0623; F02D 2041/227; F02D 41/22; F02D 2041/224; F02D 19/0628; F02D 19/0631; F02D 41/3836; F02D 2200/0602; F02D 2250/31; F02M 65/00
USPC ............ 701/114; 73/114.38, 114.41, 114.42, 73/114.43
See application file for complete search history.

(56) References Cited

U.S. PATENT DOCUMENTS

| | | | |
|---|---|---|---|
| 10,774,756 B1 * | 9/2020 | Dudar | G01M 15/08 |
| 11,313,305 B2 * | 4/2022 | Wright | F02M 65/006 |
| 11,359,582 B1 * | 6/2022 | Dudar | F02M 25/0818 |
| 2021/0017925 A1 | 1/2021 | Wright et al. | |

FOREIGN PATENT DOCUMENTS

WO   2018219829 A1   12/2018

OTHER PUBLICATIONS

Extended European Search Report for corresponding EP Application No. 23158799.9-1004/4249744 dated Aug. 30, 2023 (7 pages).

* cited by examiner

*Primary Examiner* — John Kwon
(74) *Attorney, Agent, or Firm* — THE SMALL PATENT LAW GROUP LLC; Mary D. Lawlor

(57) ABSTRACT

A method that includes coupling an external, removable fuel pressurization system to a fuel system of a vehicle. The fuel system of the vehicle is pressurized with the fuel pressurization system while the vehicle is parked and without activating a fuel consumer (e.g., an engine) of the vehicle. Decay of pressure of the fuel system is monitored following pressurization of the fuel system, and one or more of a leak, or a replaceable component, of the fuel system of the vehicle is detected based on at least in part on the decay of pressure that are monitored.

20 Claims, 6 Drawing Sheets

FUEL SYSTEM TEST APPARATUS AND METHOD

CROSS-REFERENCE TO RELATED APPLICATIONS

This application is a continuation-in-part of U.S. patent application Ser. No. 16/512,049, filed Jul. 15, 2019, the entire disclosure of which is incorporated herein by reference.

BACKGROUND

Technical Field

Embodiments of the specification relate to vehicle maintenance, and more particularly, to a removable fuel pressurization system and method of performing diagnostics.

Discussion of Art

Various fleets of vehicles have service requirements for their systems. For example, when a locomotive finishes with its route, the locomotive is taken to a motive power depot until its next use. At the depot, general maintenance may occur. This maintenance may include powering electric locomotives, fueling diesel locomotives, performing diagnostics, and repairing and replacing components. Still, diesel engines generally are not started inside the depot and must be moved outside to be started. Some diagnostics may only be performed with the locomotive and/or its engine either turned on (for some diagnostics) or off (for other diagnostics). As a result, often issues, including issues related to workmanship failures during scheduled and unscheduled maintenance, are undetected, resulting in operation inefficiencies and failures on the track.

One area that may sometimes need repair and/or testing is the pressurized fuel system of the locomotive engine. The pressurized fuel system may be disassembled and reassembled for maintenance checks, scheduled maintenance or repair, or the like during the time within the depot. Not until the locomotive is outside the depot and its engine is restarted can defects within the reassembled pressurized fuel system be detected, resulting in the locomotive requiring additional repair. It may be desirable to have a different diagnostic system and method than those that are currently available.

BRIEF DESCRIPTION

In accordance with one embodiment, a method is provided that includes coupling an external, removable fuel pressurization system to a fuel system of a vehicle while the vehicle is parked. The method also includes pressurizing the fuel system of the vehicle with the fuel pressurization system while the vehicle is parked and without activating an engine (or other fuel consumer) of the vehicle, monitoring decay of pressure of the fuel system following pressurization of the fuel system, and detecting one or more of a leak, or a replaceable component of the fuel system of the vehicle, based on at least in part on the decay of pressure that is monitored.

In accordance with another embodiment, a mobile fuel pressurization system includes a pump energizer. One or more fuel pumps are coupled with and powered by the pump energizer. A controller is configured to communicate with one or more pressure sensors operably coupled with a fuel system of a vehicle. The diagnostic system is portable and is configured to be moved into a confined space or other space where the vehicle is located, and the one or more fuel pumps on the mobile cart are configured to be fluidly coupled with the fuel system of the vehicle. The pump energizer is configured to be activated to power the one or more fuel pumps to pressurize the fuel system of the vehicle while the vehicle remains parked (e.g., in the confined space or elsewhere), and without activating a fuel consumer (e.g., engine or fuel cell) of the vehicle. The controller is configured to receive pressure measurements provided by the one or more pressure sensors to monitor decay of at least one pressure of the fuel system following pressurization of the fuel system, and the controller configured to detect one or more of a leak or a replaceable component of the fuel system of the vehicle based on the decay of pressure that is monitored.

In accordance with an embodiment, a method includes coupling an external, mobile fuel pressurization system to a vehicle fuel system, and pressurizing the vehicle fuel system with one or more pumps powered by a pump energizer of the mobile fuel pressurization system while a fuel consumer (e.g., engine or fuel cell) and a cooling system of a vehicle containing the vehicle fuel system remain deactivated. Pressures of the fuel system may be measured responsive to pressurizing the fuel system. One or more aspects that meet one or more designated criteria may be detected based on a change in the pressures of the fuel system following pressurization of the fuel system.

BRIEF DESCRIPTION OF THE DRAWINGS

These and other features and aspects of embodiments of the specification are set forth in the following detailed description and may be read with reference to the accompanying drawings in which like characters represent like parts throughout the drawings, wherein.

DETAILED DESCRIPTION

Embodiments of the specification relate to vehicle maintenance, and particularly to a test apparatus for use with a fuel pressurization system and method of performing diagnostics. Embodiments discussed herein disclose systems and methods for diagnosing issues within a vehicle using a selectively removable system.

In one embodiment, the system can diagnose issues with the vehicle at enclosed locations, such as a repair shop, in a confined space that has restricted airflow without starting or turning on a source of motive power of the vehicle. The motive power otherwise may be required to start (e.g., turn on) to perform the diagnostic process (e.g., without the systems and methods described herein). Confined spaces that have areas with restricted airflow include structures that house vehicles, including train depots, garages, vehicle repair shops, parking facilities, or the like. In one embodiment, the systems and methods pressurize a fuel delivery system of a vehicle that is pressurized with a removable and/or mobile device, where the fuel delivery system is otherwise pressurized with pumps powered (directly and/or indirectly) by an engine or other source of motive power of the vehicle.

In one embodiment, a system includes at least one pump on a mobile device such as a cart that can deliver high-pressure fuel to the fuel system. The system also can optionally include one or more sensors to detect leaks, fuel decay, or the like within the fuel system so that repairs to the system, or replacement of components, may be diagnosed and addressed. Because the removable fuel pressurization system is mobile, the diagnosis may take place within a structure that houses a vehicle, including a train depot before the vehicle exits the depot. By making the diagnosis within the train depot, the vehicle does not have to be brought back into the depot for repair, avoiding undesired logistics, downtime, labor, costs, and the like.

Figure 1:
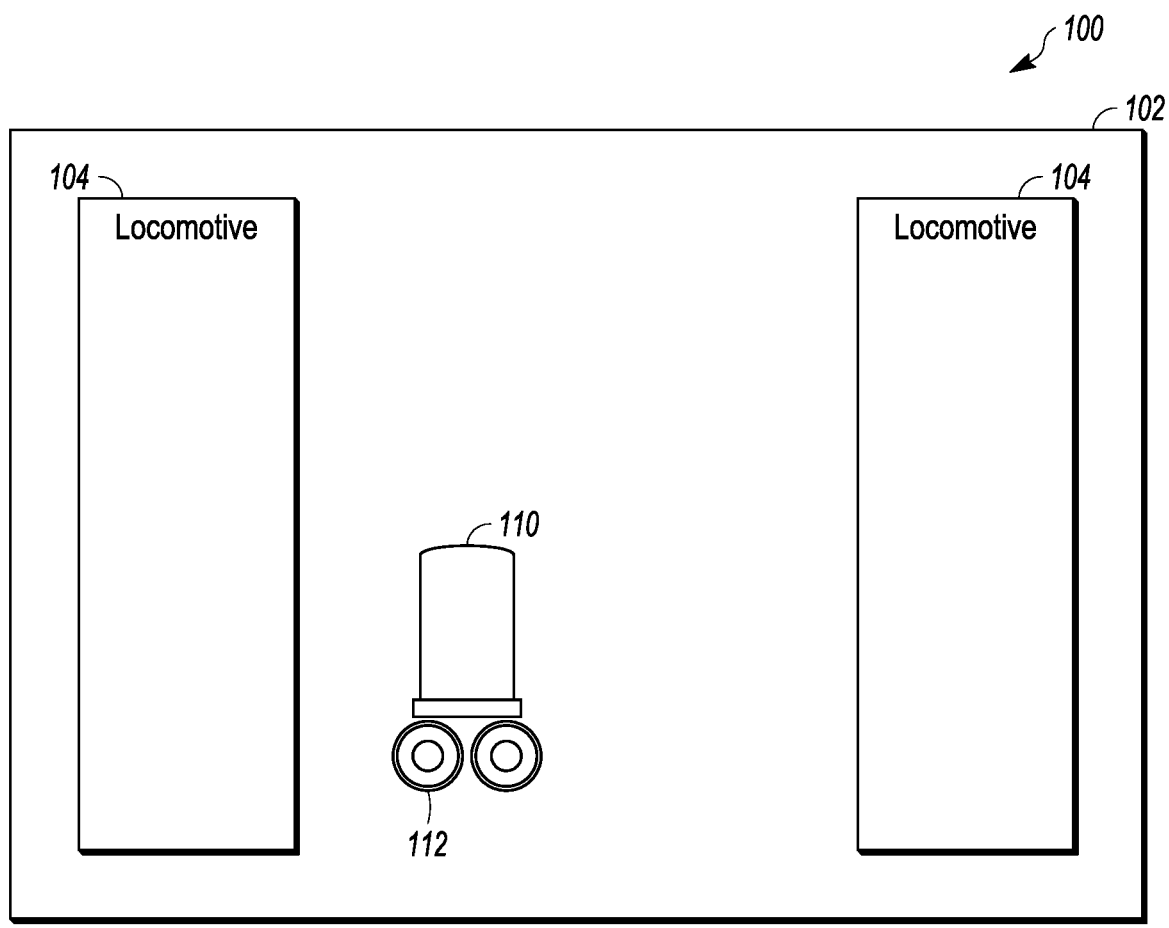
FIG. 1 illustrates one embodiment of a schematic of a structure for housing at least one vehicle.

FIG. 1 shows a partial schematic diagram of a structure 102 that houses at least one vehicle 104. The structure may be any area that includes a confined space with a restricted airflow and houses at least one vehicle 104. Such confined spaces include train depots, garages, vehicle repair shops, parking facilities, or the like. Restricted airflow when used herein includes any area in which use on an engine would be unsafe for individuals in the area. As an example, with a closed garage, starting of a vehicle without adequate ventilation could result in carbon monoxide poisoning. Alternatively, in a train depot, the operation of an engine of a vehicle in a confined space without adequate ventilation may suffocate the workers therein. Both examples represent structures that include a restricted airflow and/or potentially insufficient ventilation. There may be other reasons for not operating large equipment indoors, such as sound volume, safety concerns, thermal considerations, and the like.

In FIG. 1, the structure 102 is a confined space 100 that is a motive train depot that houses a plurality of vehicles 104, which are locomotives in this example, and that are housed for downtime and/or maintenance before and after traveling on a route. Unless expressly disclaimed or stated otherwise, the inventive subject matter described herein extends to other types of vehicles, such as automobiles, trucks (with or without trailers), buses, marine vessels, aircraft, mining vehicles, agricultural vehicles, or other off-highway vehicles. The vehicles described herein (rail vehicle systems or other vehicle systems that do not travel on rails or tracks) can be formed from a single vehicle or multiple vehicles. With respect to multi-vehicle systems, the vehicles can be mechanically coupled with each other (e.g., by couplers) or logically coupled but not mechanically coupled. For example, vehicles may be logically but not mechanically coupled when the separate vehicles communicate with each other to coordinate movements of the vehicles with each other so that the vehicles travel together (e.g., as a convoy). Also, although embodiments are described herein relative to operation in confined or enclosed spaces, these are merely provided as examples, since in other embodiments any of the systems or methods described herein could also be implemented in other areas where vehicles are parked, e.g., outside, in hangars with open sides or open doors, in carports, under awnings or other protective cover where airflow is not substantially restricted, and so on.

The motive train depot houses numerous vehicles, vehicle fuel, charging stations, maintenance equipment, and the like for repairing and maintaining the vehicles. In one embodiment a portable and removable fuel pressurization diagnostic system is provided for diagnostic testing of the high-pressure fuel system (FIG. 2) of one or more vehicles. When used herein, "high-pressure" refers to pressures of at least 1500 pounds per square inch (1500 psi). The fuel pressurization diagnostic system includes a cart 110. In one example the cart is mobile and includes at least one wheel 112 for transporting the system. In one example, the cart includes four wheels. Alternatively, the mobile cart includes tracks, rollers, or any other number of wheels. In this manner, an individual may push, pull, and/or carry the fuel pressurization diagnostic system to the vehicle that is to be tested. Motorizing the tracks or wheels allows for self-propulsion of the cart. Alternatively, the cart is stationary, including in one example where the cart is secured to, or built into, the structure.

Figure 2:
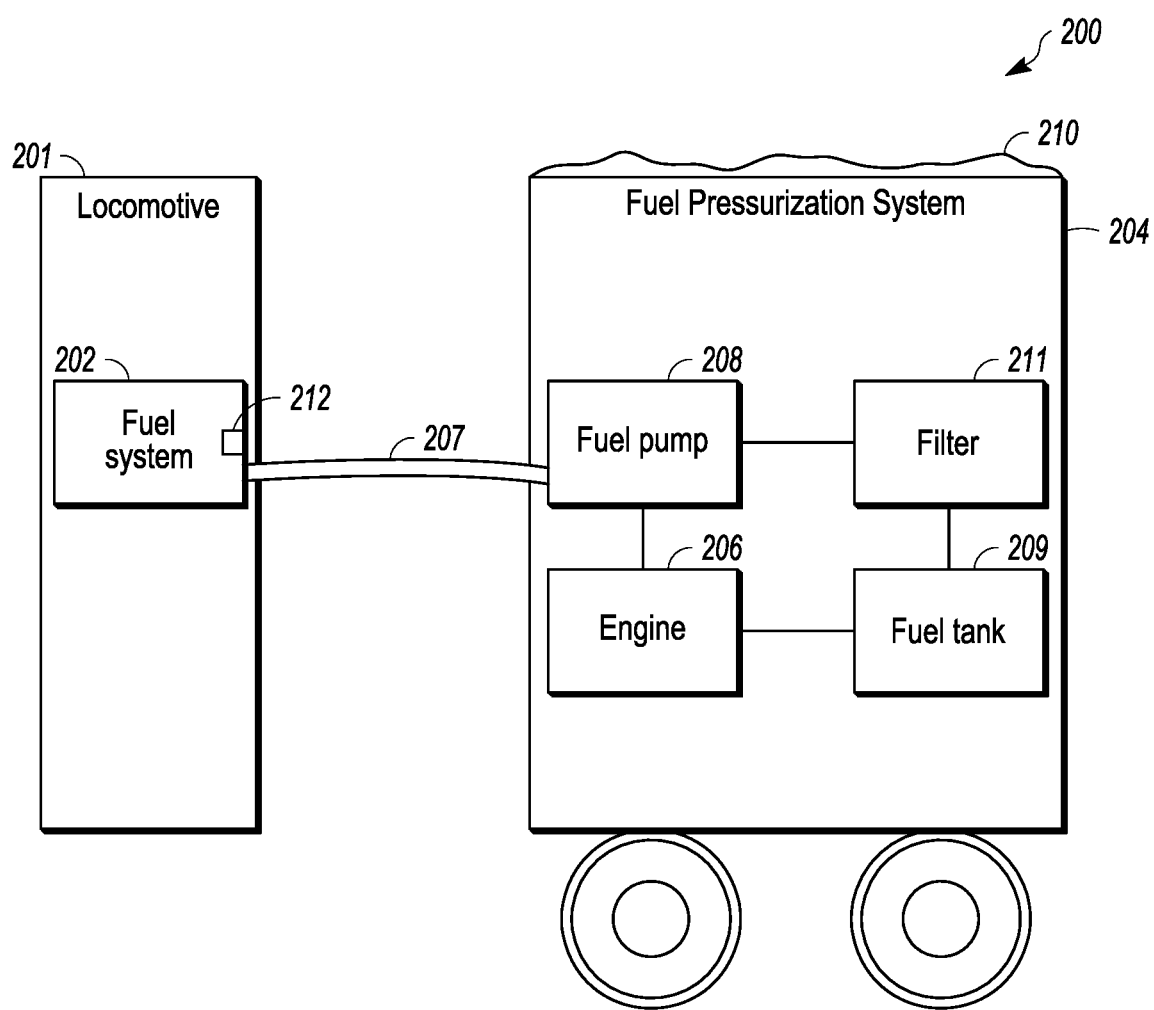
FIG. 2 illustrates a schematic of one embodiment of a fuel pressurization system coupled to a fuel system.

FIG. 2 illustrates a schematic diagram of a fuel pressurization system 200 coupled to a high-pressure fuel system 202 of a vehicle 201. The fuel pressurization system 200 includes a cart 204 that receives a pump energizer 206 mechanically coupled to at least one fuel pump 208 that is fluidly coupled to at least one fuel tank 209. Optionally, more than one fuel pump may be provided. Pump energizer refers to a device that is configured, when operated (e.g., using electricity, a fuel source, by hand, etc.) to cause a fuel pump (or pumps) to operate to pump and pressurize a fuel or fuels. Once example of a pump energizer is an engine. Another example is an electric motor.

In one example, the pump energizer is self-contained on the cart and is powered by a battery source. Alternatively, the pump energizer has a power source that may include an internal combustion, an electric, wind or air powered, a hydraulic, or the like.

In one example, the fuel system of the vehicle is pressurized by fluidly coupling at least one fuel pump to the high-pressure fuel system via a fluid conduit 207. In another example, the fluid conduit is a high-pressure hose providing a fluid flow path between the fuel pressurization system and high-pressure fuel system. The hose and/or the fluid flow path may include valving that control the flow and volume of fluid through the conduit. The fluid conduit and valving may include check valves, pressure relief valves, or the like to avoid potentially dangerous pressure levels and to improve safety of the fuel pressurization system. The fuel pressurization system may pressurize the fuel system of the vehicle to a full, or greater, working pressure.

In an example, the fuel pump of the fuel pressurization system is driven by the pump energizer (e.g., engine) of the fuel pressurization system to deliver high-pressure fuel from a fuel tank 209 along the fluid flow path, through the conduit to the high-pressure fuel system to increase the volume of fuel within the high-pressure fuel system, and to increase the pressure within the high-pressure fuel system. To this end, fuel may be supplied from the fuel pressurization system to the high-pressure fuel system based on a desired volume of fuel, based on a desired pressure within the fuel pressurization system, based on a combination of fuel volume and pressure within the fuel pressurization system, or the like. Optionally, the fuel pressurization system includes at least one filter 211 to maintain required fuel cleanliness standards as required by the vehicle engine (or other fuel consumer) being tested. (As used herein, 'fuel consumer' refers to a machine or other device that is configured to receive one or more fuels and to combust or otherwise utilize the one or more fuels to generate electricity and/or to drive a mechanical load; the mechanical load may be a generator, alternator, or other device for converting mechanical power to electrical power. Examples of fuel consumers include internal combustion engines and fuel cells.) The filters, consequently, may prevent damage to the vehicle engine, etc. being tested that could result from differing fuel requirements for different engines, etc.

In one example, the fuel pressurization system is movable, including through use of the cart 204. As a result of using a portable, or movable, fuel pressurization system, in an example embodiment when the vehicle being tested is a locomotive, the fuel pressurization system may be stored within a motive train depot and delivered to the locomotive that needs to be tested. The test may be performed by the fuel pressurization system without having to turn on the locomotive or take the locomotive outside of the motive train depot. Because the vehicle engine (or other fuel consumer) does not have to be operating, the diagnostic test may be performed in an air-restricted area such as inside the depot where vehicles typically do not operate because of safety concerns, including carbon monoxide poisoning. Therefore, in the example embodiment where the vehicle is a locomotive, a diagnostic test may be performed on the fuel system before moving the locomotive outside of the motive train depot, preventing a train from breaking down as a result of not discovering the need for a repair after the locomotive has left the motive train depot.

In an example embodiment when the fuel pressurization system is portable and mobile and may include more than one fuel pump, more than one vehicle may be tested at one time. Alternatively, when one fuel pump is not operable for any reason, the other fuel pump may be used. In another example, the cart may include a retractable hood 210 that may shield the cart from the environment. In this manner, the cart may be taken outside of a structure, such as a depot, and used for diagnostic purposes if desired. Specifically, the hood may protect the cart from rain, sleet, hail, snow or the like to prevent damage to the fuel pressurization system 200 when used in an outdoor environment.

The fuel pressurization system optionally includes at least one sensor 212 for monitoring features of interest related to the high-pressure fuel system. In one example the sensor is a pressure sensor that is coupled to an interior of the high-pressure fuel system to monitor and detect changes in pressure within the high-pressure fuel system. In particular, while in one example a diagnostic test may be performed through observation, or manually, alternatively, a sensor reading similarly may monitor the fuel system. Alternatively, the cart may have no pressure sensor, and the vehicle pressure sensor (e.g., engine pressure sensor) may be used.

For example, by pressurizing the high-pressure fuel system with the fuel pressurization system, the sensor detects data utilized to determine aspects of the vehicle fuel system that meet one or more designated criterion. As an example, a decrease within the high-pressure fuel system over time may be the designated criterion. The designated criterion may also be the pressure within the interior cavity decreasing at a rate greater than a threshold amount may indicate of a leak or fuel decay within the high-pressure fuel system, whereas below the threshold amount may indicate a healthy or fuel system that does not need repair. In another example, ranges are provided for the pressure drop as a function of time, where a range is provided between a first threshold and second threshold that represents when repair or maintenance is recommended, but not required. Specifically, a pressure drop above the first threshold indicates immediate repair or replacement is required, and the vehicle should not leave its current location before repair or replacement.

In another example, when the pressure drop falls within the range between the first threshold and the second threshold, maintenance is recommended before the vehicle leaves for a trip, but may not be required. Specifically, if scheduling conflicts exist, equipment for repair or replacement is not available, or the like occurs, the vehicle may go out on another route and be repaired at a different location. In one example, when a pressure drop falls between the first threshold and second threshold, a recommended distance to repair is determined by one or more processors so that the one or more processors, or an individual, may compare the recommended distance to the route the vehicle is to take when leaving the depot or other current location of the vehicle. In this manner, depending of the distance of the routes, some routes may be recommended against, and/or delayed until a repair is provided. When the pressure drop is below the second threshold, the vehicle is considered to be operating appropriately and repair or replacement is unneeded.

The sensor may also be positioned within a conduit or cavity of the fuel pressurization system that forms a cavity with the high-pressure fuel system, or may be inserted into the cavity of the high-pressure fuel system when the fuel pressurization system is coupled to the high-pressure fuel system. In yet another example, the sensor is within the high-pressure fuel system and the fuel pressurization system includes a transponder (FIG. 3) that receives signals from the sensor within the high-pressure fuel system. In each case pressure data is received by a controller (FIG. 3) related to the fuel pressurization system for diagnostic analysis. In one example the controller is on the cart and in some embodiments may be mobile, or transportable. In another example the controller is part of vehicle monitoring equipment that is remote to the cart, and in at least one example is a part of, or coupled to, the vehicle. Still, even when the controller is part of, or coupled to, the vehicle, the controller is considered included in the fuel pressurization system in that readings, information, and data associated with the fuel pressurization system are determined by the controller.

Figure 3:
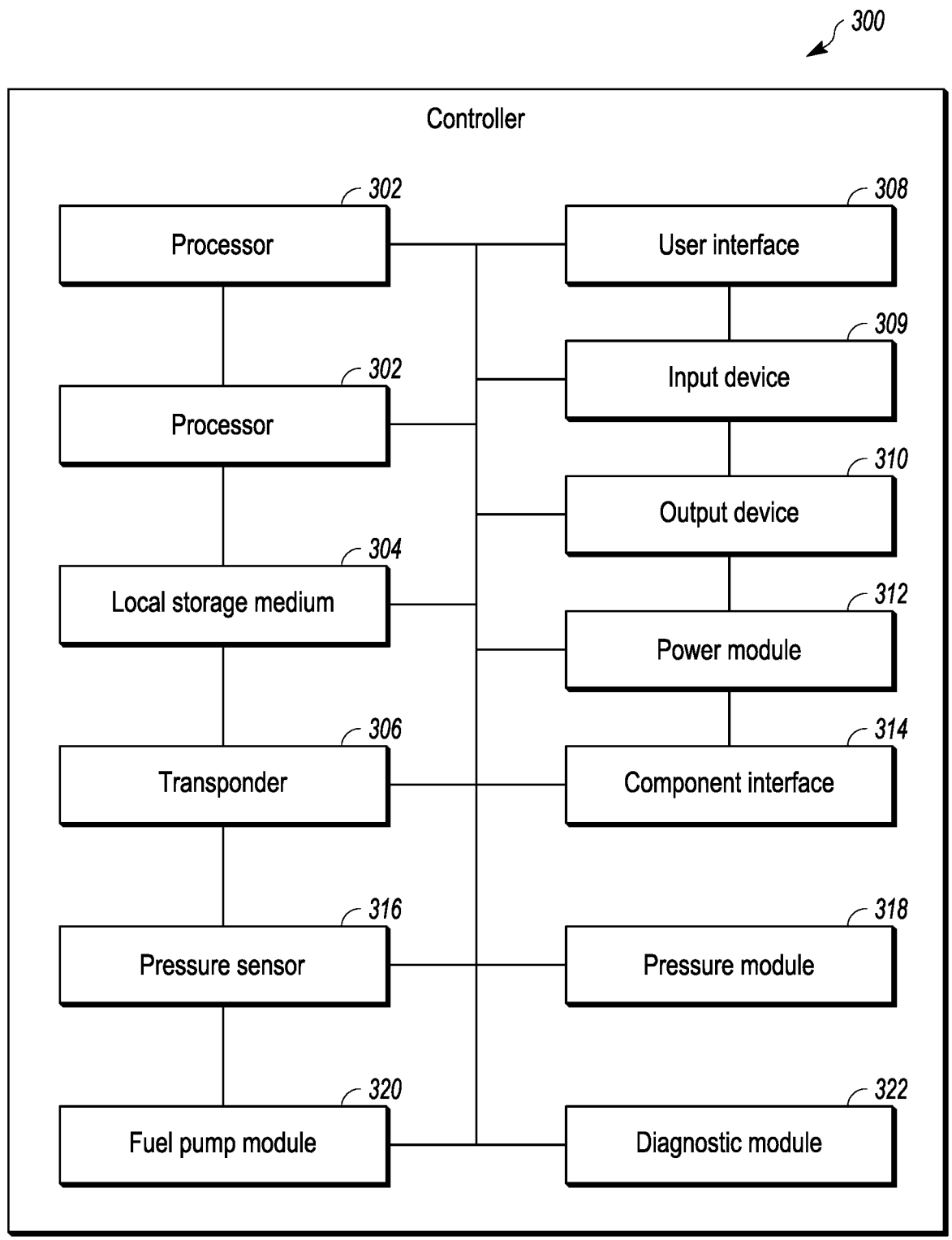
FIG. 3 illustrates a schematic view of one embodiment of a controller for a fuel pressurization system.

FIG. 3 illustrates a schematic diagram of a controller 300 of a fuel pressurization system. In one example, the controller is a controller of fuel pressurization system 200 of FIG. 2. The controller includes components such as one or more processors 302 (e.g., a microprocessor, microcomputer, application-specific integrated circuit, etc.), one or more local storage medium (also referred to as a memory) 304, a transponder 306, a user interface 308 that includes one or more input devices 309 and one or more output devices 310, a power module 312, a component interface 314, and at least one pressure sensor 316. All of these components can be operatively coupled to one another, and can be in communication with one another, by way of one or more internal communication links, such as an internal bus.

The memory can encompass one or more memory devices of any of a variety of forms (e.g., read only memory, random access memory, static random access memory, dynamic random access memory, etc.) and can be used by a processor to store and retrieve data. The data that is stored by the memory can include, but need not be limited to, operating systems, applications, user collected content and informational data. Each operating system includes executable code that controls basic functions of the device, such as interaction among the various components, communication with external devices via the transponder and/or the component interface, and storage and retrieval of applications and data to and from the memory 304. Each application includes executable code that utilizes an operating system to provide more specific functionality for the communication devices, such as file system service and handling of protected and unprotected data stored in the memory.

The transponder can utilize a known wireless technology for communication. Exemplary operation of the transponder in conjunction with other components of the controller may take a variety of forms and may include, for example, operation in which, upon reception of wireless signals, the components of controller detect communication signals from secondary devices and the transponder modulates the communication signals to recover incoming information, such as responses to inquiry requests, voice and/or data, transmitted by the wireless signals. One or more of the processors format outgoing information and conveys the outgoing information to one or more of the transponders 306 for modulation to communication signals. The transponder(s) convey the modulated signals to a remote device, such as a cell tower or a remote server (not shown).

The input and output devices may each include a variety of visual, audio, and/or mechanical devices. For example, the input devices can include a motion sensor or proximity sensor for detecting the position of a base relative to a display, visual input device including an optical sensor or camera, an audio input device including a microphone, and a mechanical input device including a keyboard, keypad, selection hard and/or soft buttons, switch, touchpad, touch screen, icons on a touch screen, a touch sensitive areas on a touch sensitive screen and/or any combination thereof. Similarly, the output devices can include a visual output device, one or more light emitting diode indicators, an audio output device such as a speaker, alarm and/or buzzer, a mechanical output device including a vibrating mechanism, or the like. The display may be touch sensitive to various types of touches and gestures.

The pressure sensor may be of any type to determine the pressure within a fuel system. The pressure sensor may be within a fluid conduit, a cavity of the fuel system, or the like. The pressure sensor in one example operates as a transducer that determines or detect the pressure of the fuel system and transmits signals to a remote device for analysis and processing.

A pressure module 318 may be electrically coupled to and/or in communication with the pressure sensor to determine the change in pressure of a fuel system and transmit activation signals to operate the fuel pressurization system to re-pressurize the high-pressure fuel system. In one example the pressure module is implemented as circuitry that converts pressure related signals from the pressure sensor to actuate the fuel pressurization system to re-pressurize the high-pressure fuel system. Alternatively, the pressure module is a software application stored in the memory that calculates a change of pressure within the high-pressure fuel system after a predetermined period of time. Then, mathematically, either through use of an algorithm, operations, or the like, a determination is made regarding when to re-pressurize the high-pressure fuel system based on pressure signals transmitted from the pressure sensor to the pressure module. Alternatively, the determination is made using look-up tables stored in the memory, or threshold values to determine when to re-pressurize the high-pressure fuel system.

A fuel pump module 320 is also electrically coupled to the pressure sensor to determine the volume of fuel being supplied into the high-pressure fuel system. Based on the pressure signals received from the pressure sensor, the fuel pump module transmits activation signals to operate the flow of fuel being supplied into the high-pressure fuel system. In one example the pressure module and fuel pump module are a single module that controls the flow of fuel into the fuel system from the fuel pressurization system. The fuel pump module may control and vary the amount of fuel flowing into and being supplied by the high-pressure fuel system. In this manner the fuel pump module may increase the flow rate of fuel, decrease the flow rate of fuel, start the flow of fuel, or stop the flow of fuel supplied by the fuel pressurization system to the fuel system.

In one example the fuel pump module is implemented as circuitry that converts pressure related signals from the pressure sensor to actuate the fuel pressurization system to activate and control the flow of fuel supplied by the high-pressure fuel system. Alternatively, the fuel pump module is a software application stored in the memory that calculates a change of pressure and/or fuel volume within the high-pressure fuel system after a predetermined period of time. Then, mathematically, either through use of an algorithm, operations, or the like a determination is made regarding how to vary the flow of fuel supplied by the high-pressure fuel system based on pressure signals transmitted from the pressure sensor to the fuel pump module. Alternatively, the determination is made using look-up tables stored in the memory, or threshold values to determine how to vary the fuel supplied to the high-pressure fuel system.

A diagnostic module 322 may be electrically coupled to the processor(s), memory, transponder, input devices, and pressure sensor to receive input signals related to features or characteristics of interest of the high-pressure fuel system. The diagnostic module may receive input signals to provide the features of interest of the high-pressure fuel system. In one example, the input signal is related to the amount of time since maintenance of the high-pressure fuel system that is stored in the memory. In another example the input signal is related to weather conditions during a previous route received from the transponder from a remote location. In yet another example the input signal is related to a temperature sensor within the high-pressure fuel system and communications data signals related to the change of temperature with the high-pressure fuel system. In another example, the input signal may relate to the change of pressure within the high-pressure fuel system received in pressure signals transmitted by the pressure sensor. In each example, the diagnostic module receives data signals related to a characteristic of interest of the fuel system.

The diagnostic module, based on the received characteristics of interest, makes determinations related to features of interest of the high-pressure fuel system and transmits these determinations for use through an output device. In one example the diagnostic module determines a decay rate and curve of the high-pressure fuel system. In another example the feature of interest is determined by isolating an interior area of the high-pressure fuel system. In yet another example, the diagnostic module determines and forms a decay profile that may indicate if a leak is at a seal, a crack, an injector, or the like. In yet another example, the diagnostic module determines changes is geometry of the high-pressure fuel system based on the characteristics of interest. These determinations, including profiles, engine maps, crack locations, decay rate, or the like may be transmitted by the diagnostic module for communication on an output device, including on a display, in an electronic message, an auditory message, or the like to present the feature of interest to a user.

In one example the diagnostic module is implemented as circuitry that converts characteristics of interests of the high-pressure fuel system received by the diagnostic module into the features of interest of the high-pressure fuel system. Alternatively, the diagnostic module is a software application stored in the memory 304 that determines the features of interest of the high-pressure fuel system. This determination may be made mathematically, either through use of an algorithm, operations, or the like, or alternatively, the determination is made using look-up tables stored in the memory, or threshold values.

Figure 4:
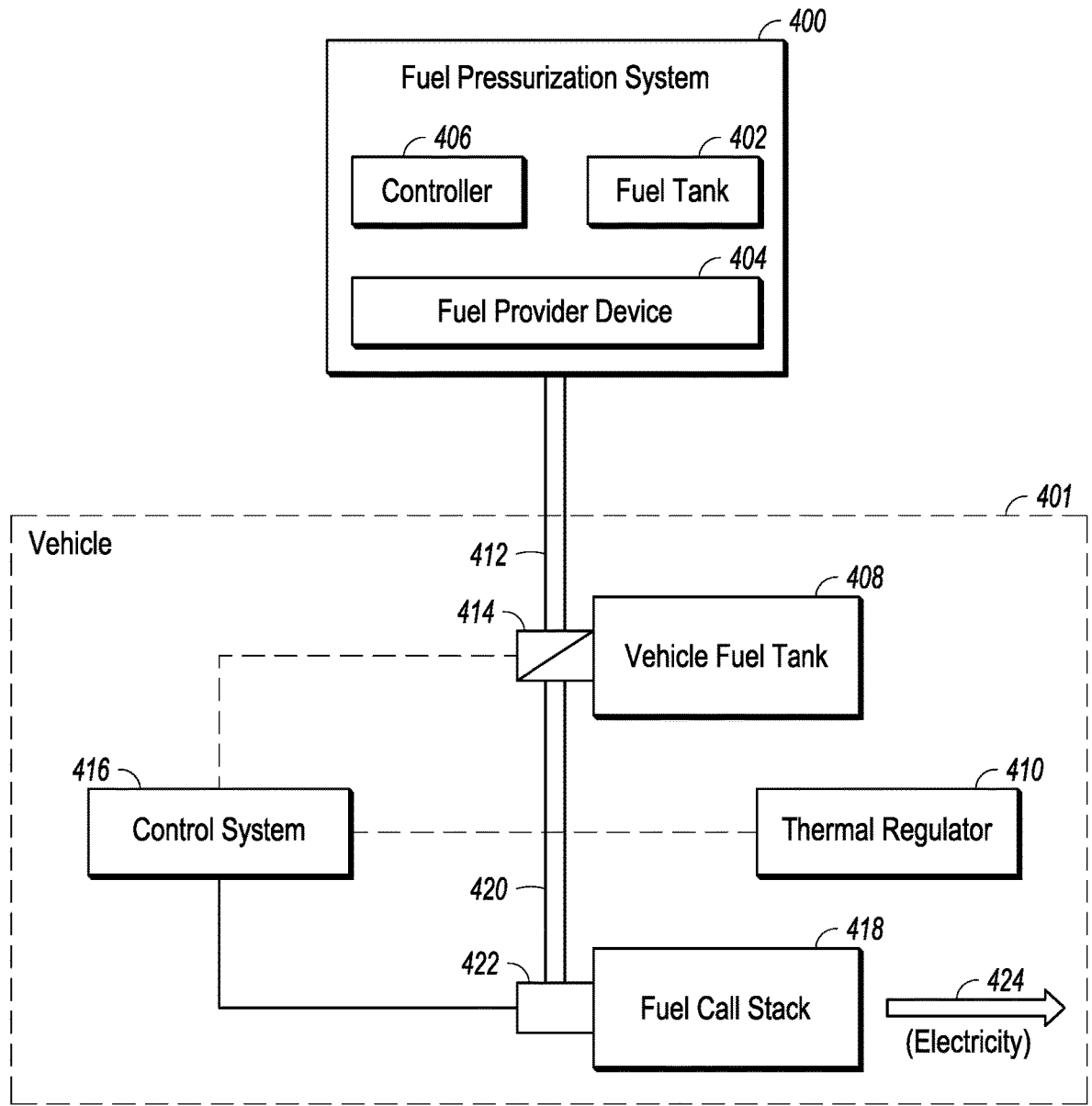
FIG. 4 illustrates a schematic of a fuel pressurization system coupled with a vehicle in accordance with one embodiment.

FIG. 4 illustrates a schematic of a portable diagnostic fuel pressurization system 400 coupled with a vehicle 401 in accordance with one embodiment. Like the fuel pressurization system 210 shown in FIG. 2, the fuel pressurization system may be a portable fuel pressurization system such that the fuel pressurization system may be coupled with a first vehicle (e.g., for maintenance or inspection of the first vehicle), disconnected from the first vehicle, moved to a second vehicle, and coupled with the second vehicle (e.g., for maintenance or inspection of the second vehicle). The fuel pressurization system may include a controller 406 that represents hardware circuitry that is coupled with and/or includes one or more processors (e.g., one or more microcontrollers, field programmable gate arrays, integrated circuits, or the like) that perform the operations described in connection with the fuel pressurization system. In one or more embodiments, the controller may include and/or represent a motor, an engine, a control unit, or the like.

The fuel pressurization system can include a controllable fuel provider device 404, that can represent a pump, a valve, or the like. The fuel provider device may be coupled with a fuel tank 402 of the fuel pressurization system. Additionally, the fuel provider device may be operably coupled with a valve system 414 of the vehicle via a fuel type connection 412. The fuel type connection can represent one or more conduits, hoses, tubes, or the like. The valve system of a fuel system of the vehicle may also be coupled with a vehicle fuel tank 408. In one or more embodiments, the vehicle fuel tank may hold or contain one or more different gaseous or liquid fuels that may be used to power one or more systems of the vehicle (e.g., propulsion systems, braking systems, auxiliary loads, or the like). For example, the vehicle fuel tank may hold or contain hydrogen, ammonia, natural gas, ethanol, dimethyl ether, gasoline, diesel fuel, or the like.

Optionally, the portable fuel pressurization system may include two or more fuel tanks, and two or more corresponding fuel type connections that may be connectable with the valve system of the vehicle. In one or more embodiments, the fuel contained within the vehicle fuel tank may correspond with (e.g., be the same as, be chemically related to, or the like) a fuel contained within the fuel tank of the fuel pressurization system. For example, the fuel tank of the portable fuel pressurization system may hold or contain hydrogen, and the vehicle fuel tank may also hold or contain hydrogen. Optionally, the portable fuel pressurization system may include plural fuel tanks and plural corresponding fuel type connections. The one or more fuel type connections that may be fluidly coupled with the valve system may correspond with one or more vehicle fuel tanks of the fuel system of the vehicle. For example, the fuel pressurization system may include five different fuel tanks containing five different fuels and five corresponding fuel type connections, and the vehicle may include two vehicle fuel tanks containing two different fuels, respectively. Only the two fuel type connections of the fuel pressurization system corresponding to the two different fuels of the vehicle may be fluidly coupled with the valve system.

During operation of the vehicle (e.g., while the fuel pressurization system is disconnected from the vehicle), the vehicle fuel tank may hold or contain hydrogen. The valve system may control the flow of hydrogen out of the vehicle fuel tank and into a fuel line 420. The fuel line may be coupled with a fuel supply control 422 that may control and supply the hydrogen from the fuel line and oxygen to a fuel consumer, namely, in this embodiment, a fuel cell stack 418. The fuel cell stack may receive the hydrogen and oxygen to generate an output 424, such as electricity, that may be used to power systems and/or components of the vehicle (e.g., including traction motors), that may be directed to an onboard energy storage device (e.g., a battery cell), or the like. In one or more embodiments, the vehicle may include a control system 416 that may control operation of the valve system and the fuel supply control. Optionally, the control system may be operably coupled with a thermal regulator 410 (e.g., a cooling system), and may control operation of the valve system and/or the fuel supply control based on thermal conditions of the vehicle.

During a maintenance or inspection event of the vehicle fuel system, the portable fuel pressurization system may be operably coupled with the fuel system of the vehicle. For example, the fuel type connection of the fuel pressurization system may be operably coupled with the valve system of the vehicle to fluidly couple the fuel tank of the portable fuel pressurization system with the valve system of the vehicle. The control system of the vehicle may control the valve system such that the vehicle fuel tank may be fluidly decoupled or disconnected from the fuel system, and the fuel tank of the portable fuel pressurization system may be fluidly coupled with the fuel system. Optionally, the vehicle fuel tank may be removed from the vehicle and may be replaced by the fuel tank of the fuel pressurization system.

The fuel system of the vehicle may be pressurized with the portable fuel pressurization system. For example, the controller of the fuel pressurization system may control operation of the fuel provider device to control the flow of fuel from the fuel tank through the valve system and through the fuel line toward the fuel supply control of the vehicle fuel system. The controller may control an amount of the fuel that is directed out of the fuel tank and into the fuel system of the vehicle, may control a flow rate of the fuel, may control an amount of pressure of the fuel being directed into the fuel system, or the like. The controller may monitor decay of pressure of the fuel system following the pressurization of the fuel system with the portable fuel pressurization system. In one embodiment, the fuel pressurization system may include one or more sensors that may provide sensor data (e.g., pressure data, pressure measurements, flow rate measurements, flow volume measurements, or the like) to the controller, the vehicle may include one or more vehicles that may provide sensor data, or the like.

The controller may receive the sensor data from the one or more sensors to monitor the decay of at least one pressure of the fuel system, to monitor a pressure drop of at least one pressure of the fuel system, to monitor a decay rate of at least one pressure of the fuel system, or the like. The controller may detect a fault of the fuel system based at least in part on the decay of pressure, the pressure drop, the decay rate of pressure, or the like. As one example, the controller may determine a waveform indicative of at least one pressure based on the sensor data, and may compare the determined waveform with a list of expected waveforms. The controller may detect a fault in the system based on the comparison of the determined waveform and the expected waveforms. For example, the determined waveform may differ from the expected waveform by a threshold margin of error, or the like. The controller may detect and/or determine a decay rate, a leak rate, a fault of the fuel system of the vehicle, or the like, based on analysis of the sensor data. For example, the controller may detect a fault of the fuel system based at least in part on the decay of pressure that is monitored.

In one or more embodiments, the controller may compare the sensor data associated with the diagnostic pressurization of the fuel system with sensor data associated with operation of the vehicle. For example, the sensor data associated with operation of the vehicle may have been obtained at a time outside of the maintenance or inspection event, while an engine (or other fuel consumer) of the vehicle is operating, or the like. Additionally, the sensor data associated with the diagnostic pressurization of the fuel system may have been obtained while the engine (or other fuel consumer) of the vehicle is not operating, during the current and/or a previous maintenance event, or the like. The controller may compare the diagnostic sensor data with the operational sensor data to determine a fuel system component that may be responsible, at least in part, for the loss of at least pressure (e.g., the pressure drop), for the decay of at least one pressure, or the like.

In one or more embodiments, the controller may direct the repair and/or replacement of the fuel system based on the decay rate and/or the detection of the fault of the fuel system. Optionally, the controller may communicate an alert, such as with an operator of the portable fuel pressurization system, with an off-board controller (e.g., a back-office server), with a controller of the vehicle, or the like, with a notification of the detection of the fault, an indication of the severity of the fault (e.g., if immediate repair is required), an indication of where the fault is located (e.g., the fault is a leak within the fuel line, a fault within the fuel supply control, or the like), or the like. For example, the controller may communicate notification (e.g., such as an output signal) indicating the need to repair or replace one or more components of the fuel system of the vehicle based on the pressure drop or decay rate being above a determined threshold value.

Figure 5:
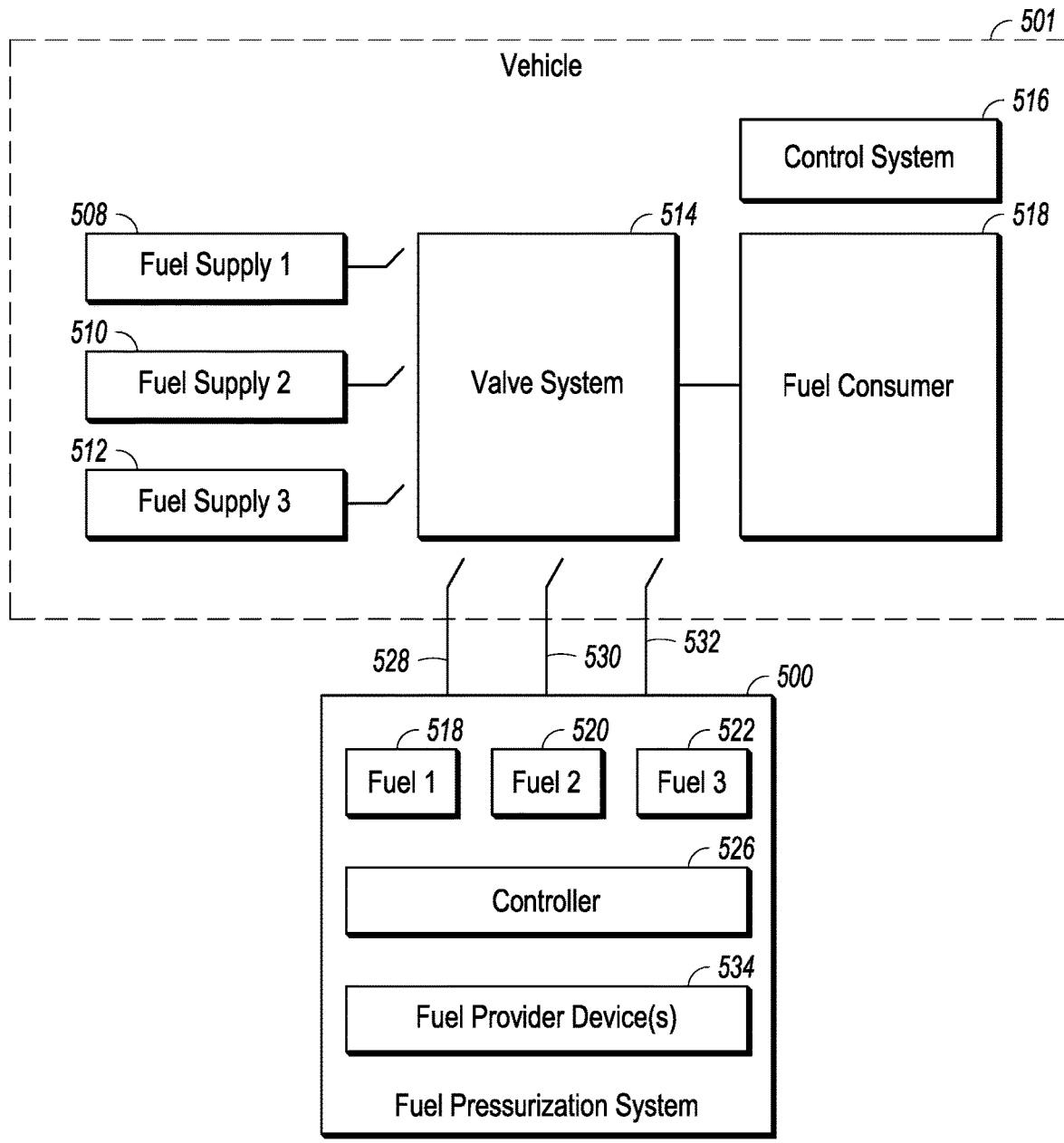
FIG. 5 illustrates a schematic of a fuel pressurization system coupled with a vehicle in accordance with one embodiment.

FIG. 5 illustrates a schematic of a portable diagnostic fuel pressurization system 500 coupled with a vehicle 501 in accordance with one embodiment. Like the portable fuel pressurization system shown in FIG. 4, the fuel pressurization system includes a controller 526 that represents hardware circuitry that is coupled with and/or includes one or more processors (e.g., one or more microcontrollers, field programmable gate arrays, integrated circuits, or the like) that perform the operations described in connection with the fuel pressurization system. In one or more embodiments, the controller may include, represent, and/or be operably coupled with a motor, an engine, a control unit, or the like, of the fuel pressurization system.

The controller may control operation of one or more fuel provider devices 534, that can represent one or more pumps, valves, or the like, that may control the flow of fuel from one or more fuel tanks 518, 520, 522 toward a valve system 514 of a fuel system of the vehicle. Each of the fuel tanks may include corresponding fuel type connections 528, 530, 532 that may be used to fluidly couple or decouple one or more of the fuel tanks with the valve system. The fuel tanks of the portable fuel pressurization system may correspond with vehicle fuel tanks 508, 510, 512 of the fuel system of the vehicle. For example, a first vehicle fuel tank 508 may contain hydrogen, and a first fuel tank 518 of the fuel pressurization system may also contain hydrogen; a second vehicle fuel tank 510 may contain ammonia, and a second fuel tank 520 of the fuel pressurization system may also contain ammonia; and a third vehicle fuel tank 512 may contain ethanol, and a third fuel tank 522 of the fuel pressurization system may also contain ethanol.

During an inspection and/or maintenance event, a control system 516 of the vehicle may control operation of the valve system to fluidly couple and/or decouple one or more of the vehicle fuel tanks from a fuel consumer 518 of the vehicle. Additionally, the control system may control operation of the valve system to fluidly couple and/or decouple one or more of the fuel tanks of the fuel pressurization system from the fuel consumer of the vehicle. Responsive to the control system fluidly coupling and/or decoupling the vehicle fuel tanks and/or the fuel tanks of the pressurization system with the fuel consumer, the controller of the fuel pressurization system may control operation of the fuel provider device(s) to pressurize at least a portion of the fuel system of the vehicle. For example, the fuel pressurization system may pressurize the fuel system without activating an engine (or other fuel consumer) of the vehicle. In one embodiment, the fuel pressurization system may include a single fuel provider device (e.g., a single pump) that may compartmentalize portions of the fuel system and selectively pressurize one or more of the compartmentalized portions. Optionally, the controller of the fuel pressurization system may be operably coupled with one or more fuel pumps of the fuel system of the vehicle (not shown). The controller may selectively activate one or more of the fuel pumps responsive to pressurizing the fuel system.

Figure 6:
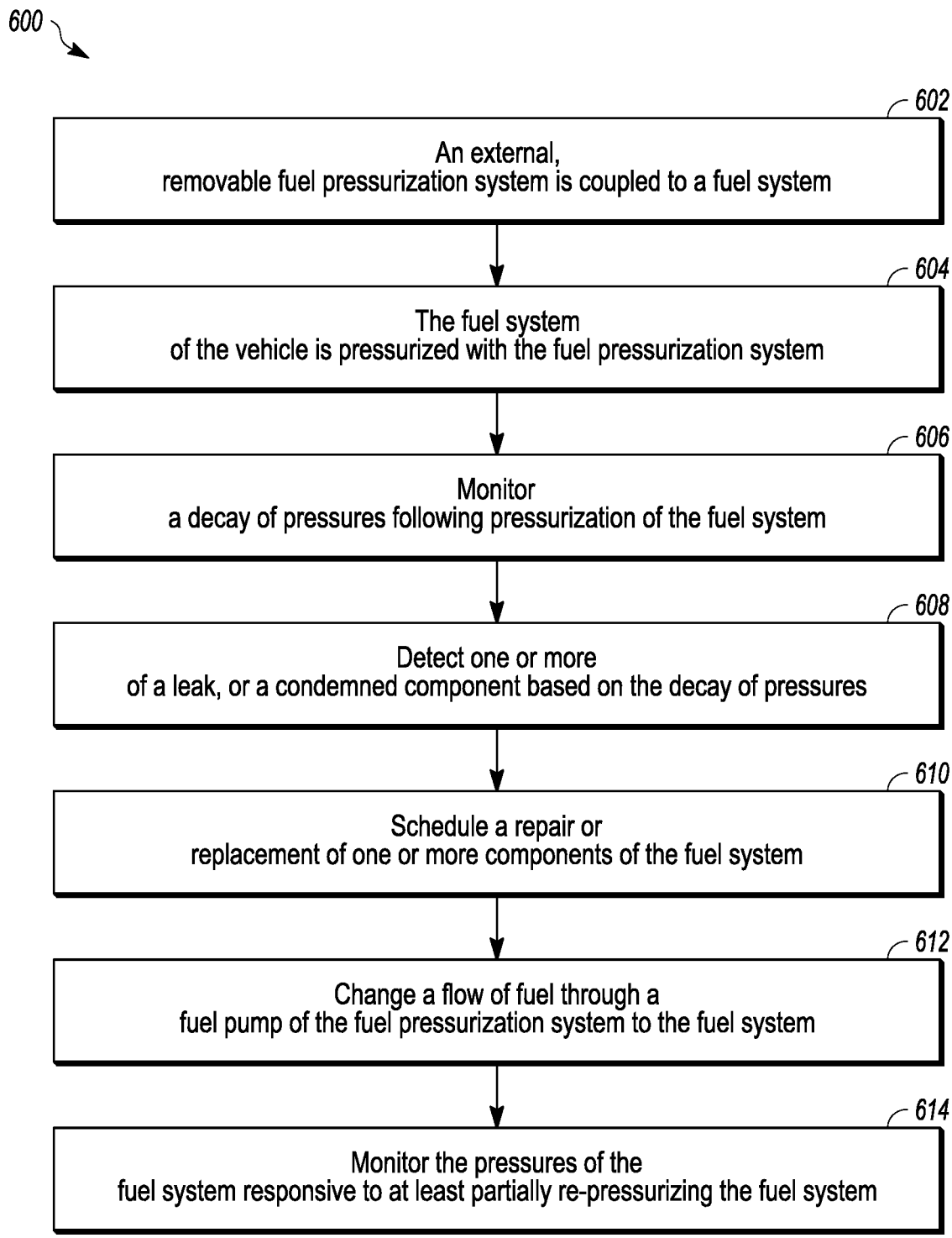
FIG. 6 illustrates a flow block diagram of one embodiment of a process for performing a diagnosis of a vehicle component.

FIG. 6 is a flow chart illustrating a process 600 for detecting one or more of a leak, or a replaceable component of a fuel system of a vehicle, based on monitored decay of pressure. In one example, the process is performed on a high-pressure fuel system of a vehicle using a fuel pressurization system in an area that has restricted airflow. In one example, the fuel system is the high-pressure fuel system 202 of FIG. 2 and the fuel pressurization system is the fuel pressurization system 200 of FIG. 2.

At step 602, an external, removable, portable diagnostic fuel pressurization system is coupled to a fuel system of a vehicle via one or more fuel type connections. In one example, the portable fuel pressurization system may be fluidly coupled with the vehicle while the vehicle remains in area with restricted air flow, that in one example is a motive power depot. In another example the vehicle is a locomotive and is within the motive power depot after completing a route. The vehicle may be in the motive power depot awaiting to start a new route, stopped for a predetermined amount of time before a next route, stopped for maintenance and/or repair, or the like. The motive power depot may be any type of structure that may house the vehicle and accommodate a fuel pressurization system. In one example, coupling the fuel pressurization system to the fuel system of the vehicle includes moving the fuel pressurization system to the vehicle in the motive power depot. Specifically, in an example, the removeable fuel pressurization system is portable, including of size and shape to be carried from to different locations within and outside of the motive power depot. In one example the fuel pressurization system includes a cart, or wheels that facilitate movement of the fuel pressurization system within the motive power depot.

At step 604, the fuel system of the vehicle is pressurized with the fuel pressurization system without activating an engine or other fuel consumer of the vehicle. In one example, the vehicle, and consequently the engine (or other fuel consumer) of the vehicle, is not operating. In this manner, the diagnostic test of the engine (or other fuel consumer) may be performed within an area that would otherwise be precluded. Because the vehicle engine (or other fuel consumer) is not operating, engine/etc. cooling, or other functions of the vehicle that may result if variance in pressure readings may be deactivated during pressure sensing, and may not interfere with determinations. Specifically, only the fuel pressurization system pressurizes the engine and the engine (or other fuel consumer) itself may be deactivated or turned off. As a result, the pressurization may be varied and controlled to provide favorable conditions for the pressure sensor or other input devices to receive accurate readings associated with the fuel system. This minimizes determinations of false or inaccurate results that lead to unneeded repairs that waste time, effort, and cost.

In another example, the fuel system of the vehicle is pressurized with the fuel pressurization system while the vehicle remains in the motive power depot or at another location. In particular, by determining if repairs are needed for a fuel system within the motive power depot using the movable fuel pressurization system, the repairs may be made during a downtime of the vehicle. Thus, instead of starting up the vehicle and discovering the needed repair after the vehicle is outside of the motive power depot, the repair is done before start-up. This prevents the waste of time to bring the vehicle back into the motive power depot, and the delay in logistics caused by a vehicle that needs to leave on a route having to be repaired. In one example, the fuel system of the vehicle is pressurized by fluidly coupling a pump of the fuel pressurization system to the fuel system, wherein the pump of the fuel pressurization system is driven by an engine or other pump energizer of the fuel pressurization system.

At step 606, one or more processors monitor a decay of pressure, a pressure drop, a decay rate of a pressure, or the like, of the fuel system following pressurization of the fuel system. In one example, a pressure sensor detects the change in pressure over time of a high-pressure fuel system of a vehicle. By monitoring the decay of pressure, characteristics of interest of the fuel system are determined that may be used by a diagnostic module. In one example, the decay of pressure of the fuel system is monitored to determine a decay rate. In one example, the decay of pressure of the fuel system is monitored to determine a waveform relating to the decay of pressure. These measurements and determinations may be provided using an algorithm, graph, or the like based on the monitored pressures of the fuel system. The waveform that is determined may be compared against a list or table of historical waveforms. The waveforms in the list may be associated with various components or failure modes. That is, a leak at a gasket may produce one distinct waveform, but a crack in a fuel line may produce another waveform. Similarly, waveforms may be associated with individual cylinders in the engine. Matching the waveform to the firing pattern of the cylinders may allow a particular cylinder, injector, piston, or valve to be identified as perturbing the waveform. Diagnosing which component needs to be repaired or replaced can be accomplished based at least in part with waveform analysis. In yet another example, an individual observes the fuel system and provides an input into the one or more processors of a leak condition.

At step 608, one or more processors detect a leak of the fuel system of the vehicle based at least in part on the decay of pressure that is monitored. Further, it may indicate one or more components that should be repaired or replaced (i.e., replaceable components), or that workmanship failures of scheduled and/or unscheduled maintenance is present. In one example, the decay of pressure may be used by a diagnostic module that determines that a leak or replaceable component is present as a result of a change in pressure over a predetermined time, or interval, is more than a threshold drop in pressure over that predetermined time. In another example, the diagnostic module includes an algorithm that based on the monitored change in pressure over a predetermined time, or interval, detects the leak or replaceable component is present. In yet another example, one or more processors include a look-up table and a detected pressure drop over a predetermined time, or interval, to detect an improperly reassembled system from recent maintenance is present.

At step 610, one or more processors schedules a repair or replacement of one or more components of the fuel system responsive to detecting the one or more of the leak, or replaceable component, of the fuel system. In one example, the vehicle is a vehicle within a motive power depot and the repair or replacement occurs before the vehicle leaves the motive power depot and travels along one or more routes to another location. In this manner, the repair or replacement occurs without the vehicle leaving the motive depot and the vehicle operating with a faulty fuel system that reduces efficiencies, causes additional damage to fuel system or rest of the engine, results in the vehicle breaking down mid-route, or the like. This repair and replacement may reduce engine wear, reduce down-time, reduce costs, and the like. In one example, the one or more processors communicate with a remote device to schedule the repair or replacement. The remote device includes a computing device at the motive power depot that includes a memory with a database related to replacement and repair schedules for vehicles within, or associated with, the motive power depot, and mechanics or individuals that provide repairs and/or replacements. The one or more processors may communicate wirelessly with the remote device, through a hardwire, or the like.

At step 612, one or more processors, in response to detecting one or more of a decay rate of interest, or a decay waveform of interest, in the pressures of the fuel system, changes a flow of fuel through fuel pumps of the fuel pressurization system to the fuel system. In one example, the one or more processors at least partially re-pressurize the fuel system of the vehicle using the fuel pressurization system. The one or more processors automatically actuate the pump energizer of the fuel pressurization system to have the fuel pumps provide additional high-pressure fuel within the fuel system. Optionally, in another example, the one or more processors selectively change the flow of fuel through the fuel pumps of the fuel system of the vehicle by selectively activating one or more of the fuel pumps responsive to pressurizing the fuel system using the fuel pressurization system. The replaceable component of the fuel system is then detected as at least one of the fuel pumps based on the decay of pressure that are monitored. In this manner, the one or more processors pinpoint the component, in this example the fuel pumps, that is in need of repair or replacement.

At step 614, the one or more processors monitor the pressures of the fuel system responsive to at least partially re-pressurizing the fuel system. The one or more of the leak, or the replaceable component, of the fuel system of the vehicle may then be detected based at least in part on the pressures of the fuel system that are monitored responsive to at least partially re-pressurizing the fuel system.

In one embodiment, the controllers or systems described herein may have a local data collection system deployed and may use machine learning to enable derivation-based learning outcomes. The controllers may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used making determinations, calculations, comparisons and behavior analytics, and the like.

In one embodiment, the controllers may include a policy engine that may apply one or more policies. These policies may be based at least in part on characteristics of a given item of equipment or environment. With respect to control policies, a neural network can receive input of a number of environmental and task-related parameters. These parameters may include, for example, operational input regarding operating equipment, data from various sensors, location and/or position data, and the like. The neural network can be trained to generate an output based on these inputs, with the output representing an action or sequence of actions that the equipment or system should take to accomplish the goal of the operation. During operation of one embodiment, a determination can occur by processing the inputs through the parameters of the neural network to generate a value at the output node designating that action as the desired action. This action may translate into a signal that causes the vehicle to operate. This may be accomplished via back-propagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes, which may be weighed relative to each other.

Provided are systems and methods for diagnosing leak and/or fuel decay damage within a high-pressure fuel system using a removable fuel pressurization system, and repairing or replacing a component accordingly. The removable high-pressure fuel system includes at least one fuel pump that couples to a fuel system of a vehicle and can deliver high-pressure fuel to the fuel system. The fuel pressurization system also includes sensors to detect leaks, fuel decay, or the like within the fuel system. Based on detecting the leaks, or fuel decay, the fuel pressurization system may vary the flow of fuel into the fuel system, including to re-pressurize the fuel system to verify determination related to the leaks and/or fuel decay to improve accuracy of determinations. Because the removable fuel pressurization system is mobile, the determination a repair or replacement is needed may take place within a train depot before the vehicle exits the depot for starting. By making this determination within the train depot, the vehicle does not have to be brought back into the depot for repair, avoiding undesired logistics, downtime, labor, costs, and the like.

In accordance with certain embodiments discussed herein a method is provided that includes coupling an external, removable fuel pressurization system to a fuel system of a vehicle while the vehicle remains in a motive power depot, and pressurizing the fuel system of the vehicle with the fuel pressurization system while the vehicle remains in the motive power depot and without activating an engine or other fuel consumer of the vehicle. A decay of pressure of the fuel system is monitored following pressurization of the fuel system, one or more of a leak or a replaceable component of the fuel system of the vehicle are detected based on the decay of pressure that are monitored.

Optionally, one or more components of the fuel system of the vehicle are repaired or replaced responsive to detecting the one or more of the leak or the presence of a replaceable component of the fuel system before the vehicle leaves the motive power depot and travels along one or more routes to another location. Alternatively, coupling the fuel pressurization system to the fuel system of the vehicle includes moving the fuel pressurization system to the vehicle in the motive power depot.

In one aspect, the fuel system of the vehicle is pressurized by fluidly coupling a pump of the fuel pressurization system to the fuel system, and the pump of the fuel pressurization system is driven by a pump energizer of the fuel pressurization system. In another aspect, the fuel system is pressurized also without activating a cooling system of the vehicle. In yet another aspect, the decay of pressure of the fuel system is monitored to determine a decay rate or a waveform.

Optionally, the fuel system of the vehicle is at least partially re-pressurized using the fuel pressurization system responsive to detecting one or more of a decay rate of interest or a decay waveform of interest in the pressures of the fuel system, and the pressures of the fuel system are monitored responsive to at least partially re-pressurizing the fuel system. The one or more of the leak or presence of the replaceable component of the fuel system of the vehicle is detected based at least in part on the pressures of the fuel system that are monitored responsive to at least partially re-pressurizing the fuel system. In another aspect a flow of fuel is selectively changed through fuel pumps of the fuel system of the vehicle by selectively activating one or more of the fuel pumps responsive to pressurizing the fuel system using the fuel pressurization system. The replaceable component of the fuel system is detected as at least one of the fuel pumps based on the decay of pressure that are monitored.

In one embodiment, the diagnostic system's fuel pumps may selectively pump fuel system cleaner or another fluid through the fuel system. The fluid may be fuel, but with cleaning additives. This may allow the fuel system to loop back into fuel storage unit and by which cycling the cleaning fluid fuel flow may be useful to reduce deposits in the fuel system's components.

While embodiments of the invention may have shown relative to a rail vehicle as an example vehicle, suitable vehicles may include passenger cars, on-road trucks, buses, off road vehicles, aircraft, mining equipment, and marine vessels. Fleet vehicles are suited for use with embodiments of the invention. Mining equipment may operate in the confines of a mine. Aircraft may be located in hangers, in which it may be undesirable to turn on the engines. Pressurized fuel systems may be present as stationary or semi-permanent power generators. Such generators may be somewhat permanently housed within a structure that is plumbed for exhaust gas, but which may need partial disassembly to maintain (at which point the ventilation or sound proofing may not be installed). To the extent that such is the case, these power generators (fixed or mobile) may be counted as vehicles for purposes of using embodiments of the invention.

In accordance with certain embodiments discussed herein, a mobile fuel pressurization system is provided that includes a mobile cart, a pump engine or other pump energizer disposed on the mobile cart, and one or more fuel pumps disposed on the mobile cart, the one or more fuel pumps coupled with and powered by the pump engine (or other pump energizer). Also included is a controller disposed on the mobile cart and configured to communicate with one or more pressure sensors operably coupled with a fuel system of a vehicle. The mobile cart is configured to be moved into a motive power depot where the vehicle is located, the one or more fuel pumps on the mobile cart are configured to be fluidly coupled with the fuel system of the vehicle, and the pump engine (or other pump energizer) is configured to be activated to power the one or more fuel pumps on the mobile cart to pressurize the fuel system of the vehicle while the vehicle remains parked and without activating a fuel consumer of the vehicle. The controller is configured to receive pressure measurements provided by the one or more pressure sensors to monitor decay of pressure of the fuel system following pressurization of the fuel system, the controller configured to detect one or more of a leak or a replaceable component of the fuel system of the vehicle based on the decay of pressure that are monitored.

Optionally, the controller is configured to output instructions to one or more of repair or replace one or more components of the fuel system of the vehicle responsive to detecting the one or more of the leak or the replaceable component of the fuel system before the vehicle leaves the motive power depot and travels along one or more routes to another location. In another aspect, coupling the fuel pressurization system to the fuel system of the vehicle includes moving the fuel pressurization system to the vehicle in the motive power depot. In yet another aspect, the one or more fuel pumps are configured to pressurize the fuel system without activating a cooling system of the vehicle. In one aspect, the controller is configured to monitor the decay of pressure of the fuel system by determining one or more of a decay rate or a waveform of the decay of pressure.

Optionally, the controller also is configured to control operation of the one or more fuel pumps to at least partially re-pressurize the fuel system of the vehicle responsive to detecting one or more of a decay rate of interest or a decay waveform of interest in the pressures of the fuel system. Alternatively, the controller also is configured to monitor the pressures of the fuel system responsive to at least partially re-pressurizing the fuel system, the controller configured to detect the one or more of the leak or the replaceable component based at least in part on the pressures of the fuel system that are monitored responsive to at least partially re-pressurizing the fuel system.

In another aspect, the controller also is configured to be operably coupled with fuel pumps of the fuel system of the vehicle, the controller configured to selectively activate one or more of the fuel pumps responsive to pressurizing the fuel system, the controller configured to detect the replaceable component of the fuel system as at least one of the fuel pumps based on the decay of pressure that are monitored.

In accordance with certain embodiments discussed herein, a method is provided that includes coupling an external, mobile fuel pressurization system to a vehicle fuel system, and pressurizing the vehicle fuel system with one or more pumps powered by a pump energizer of the mobile fuel pressurization system while portions (e.g., an engine and a cooling system) of a vehicle containing the vehicle fuel system remain deactivated. Pressures of the fuel system are measured from pressurization of the fuel system, and one or more determined aspects of the vehicle fuel system meet one or more designated criterion are detected based on a change in the pressures of the fuel system following pressurization of the fuel system.

Optionally, coupling the fuel pressurization system to the vehicle fuel system includes moving the fuel pressurization system to the vehicle in a motive power depot while the vehicle remains stationary.

Optionally, the vehicle fuel system is at least partially re-pressurizing using the fuel pressurization system responsive to detecting the one or more determined aspects of the vehicle fuel system meet one or more designated criterion, and the pressures of the fuel system are monitored responsive to at least partially re-pressurizing the fuel system. One or more of a leak or a replaceable component of the vehicle fuel system is detected based at least in part on the pressures of the vehicle fuel system that are monitored responsive to at least partially re-pressurizing the fuel system.

In an embodiment, a portable diagnostic system includes a pump energizer, one or more fuel pumps coupled with and powered by the pump energizer, a fuel reservoir configured to contain a fuel, a flexible fuel conduit terminated by a fluid-tight connector, and a controller. The connector is configured for selective attachment to a fuel input of a fuel system of a vehicle. When attached, the connector establishes a fluid-tight connection where fuel can be introduced into the fuel system but cannot escape from the fuel system via the connector/conduit. The pump energizer is configured to be activated and thereby to power the one or more fuel pumps to pressurize at least a portion of the fuel system of the vehicle without activating a fuel consumer of the vehicle, e.g., an engine or fuel cell of the vehicle.

The portable diagnostic system also includes a pressure sensor positioned in an interior cavity of the fluid-tight connector. (The system may include plural pressure sensors.) When the connector is attached to the fuel input of the vehicle fuel system, the cavity, and thereby the pressure sensor, is in fluid communication with the fuel input, and thereby with the vehicle fuel system generally. In one aspect, the connector may include an internal valve or other controllable device for selectively opening and closing interior passage of the fuel conduit to the connector cavity. In a first mode of operation, the valve is controlled shut and the connector is de-attached from the vehicle fuel input. The valve prevents fuel in the portable diagnostic system from exiting the connector/conduit. In a second mode of operation, the connector is attached to the vehicle fuel input with the valve is controlled to an open position. The portable diagnostic system may then be controlled to input pressurized fuel into the vehicle fuel system. In a third mode of operation, the connector remains attached to the vehicle fuel input, but the valve is controlled to a closed position. No further fuel is inputted into the vehicle fuel system from the portable diagnostic system, however, the pressure sensor in the interior cavity of the connector, which is in fluid communication with the vehicle fuel system, detects a pressure level of fuel in the vehicle fuel system. (According to one aspect, the pressure level of the fuel in the vehicle fuel system can be detected without having to use a sensor of the vehicle fuel system, or perhaps in combination with sensor data from a sensor of the vehicle fuel system, or without having to separately deploy a removable sensor into the vehicle fuel system.)

The portable diagnostic system may also include a controller configured to communicate with the pressure sensor (or sensors), e.g., via a wired attachment or a wireless communication link. The controller is configured to receive pressure measurements provided by the pressure sensor to determine a pressure drop or decay rate of a pressure of the fuel system following pressurization of the fuel system. For example, the portable diagnostic system may be used to pressurize the vehicle fuel system, followed by closing the valve of the connector for allowing the pressure sensor to sense the pressure while the connector is still attached to the fuel system fuel input but the remainder of the portable diagnostic system is fluidly isolated from the fuel system (i.e., only the pressure sensor and connector interior cavity remain fluidly connected to the fuel system).

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A portable diagnostic system, comprising:
   a pump energizer;
   one or more fuel pumps coupled with and powered by the pump energizer; and
   a controller configured to communicate with one or more pressure sensors operably coupled with a fuel system of a vehicle,
   the one or more fuel pumps being fluidly couplable with the fuel system of the vehicle, and the pump energizer is configured to be activated and thereby to power the one or more fuel pumps to pressurize at least a portion of the fuel system of the vehicle without activating a fuel consumer of the vehicle, and
   the controller configured to receive pressure measurements provided by the one or more pressure sensors to determine a pressure drop or decay rate of at least one pressure of the fuel system following pressurization of the fuel system.

2. The diagnostic system of claim 1, wherein the controller is configured to output a signal indicating a need to repair or replace one or more components of the fuel system of the vehicle based on the pressure drop or decay rate being above a designated threshold value.

3. The diagnostic system of claim 1, wherein the controller is configured to communicate with the one or more pressure sensors to monitor the pressure drop or the decay rate of the at least one pressure of the the fuel system and thereby to determine a waveform, and to compare the waveform to a table or list of waveforms within a database, wherein a waveform match between the determined waveform and the table or list of waveforms indicates information about a location or type of leak causing the pressure drop or the decay rate.

4. The diagnostic system of claim 1, wherein the one or more fuel pumps are configured to compartmentalize portions of the fuel system and to selectively pressurize one or more of the compartmentalized portions.

5. The diagnostic system of claim 1, wherein the controller is configured to monitor the pressure drop of the at least one pressure of the fuel system and thereby to determine one or more of the decay rate or a leak rate.

6. The diagnostic system of claim 1, wherein the controller also is configured to control operation of the one or more fuel pumps to at least partially re-pressurize the fuel system of the vehicle responsive to detecting one or more of a decay rate of interest or a decay waveform of interest in the pressure measurements of the fuel system.

7. The diagnostic system of claim 1, wherein the controller is configured to compare sensor data associated with operation of the vehicle with sensor data associated with the pressurization of the fuel system by the one or more fuel pumps, wherein the controller also is configured to determine a fuel system component responsible, at least in part, for a loss of pressure based at least in part on the comparison.

8. The diagnostic system of claim 1, wherein the controller also is configured to be operably coupled with fuel pumps of the fuel system of the vehicle, the controller configured to selectively activate one or more of the fuel pumps responsive to pressurizing the fuel system, the controller configured to detect a replaceable component of the fuel system based on the pressure drop or the decay rate that are determined.

9. The diagnostic system of claim 1, further comprising one or more fuel tanks fluidly coupled with the one or more fuel pumps, the one or more fuel tanks containing one or more fuels.

10. The diagnostic system of claim 9, further comprising one or more fuel type connections corresponding to the one or more fuel tanks, wherein the one or more fuel type connections are configured to be operably coupled with the fuel system of the vehicle.

11. The diagnostic system of claim 9, wherein the one or more fuels includes hydrogen, ammonia, natural gas, ethanol, or dimethyl ether.

12. A method comprising:
pressurizing a fuel system of a vehicle with a fuel pressurization system via one or more fuel type connections without activating a fuel consumer of the vehicle;
monitoring a decay of pressure of the fuel system following pressurization of the fuel system; and
detecting a fault of the fuel system of the vehicle based at least in part on the decay of pressure that is monitored.

13. The method of claim 12, further comprising controlling operation of a valve system of the fuel system to fluidly decouple the one or more vehicle fuel tanks from the fuel system responsive to coupling the one or more fuel type connections to the fuel system.

14. The method of claim 12, further comprising controlling operation of a valve system of the fuel system to fluidly couple the fuel pressurization system with the fuel system via the valve system.

15. The method of claim 12, wherein the one or more fuels includes one or more of hydrogen, ammonia, natural gas, ethanol, or dimethyl ether.

16. The method of claim 12, further comprising directing repair or replacement of one or more components of the fuel system of the vehicle responsive to detecting the fault of the fuel system.

17. The method of claim 12, further comprising monitoring the decay of the pressure of the fuel system by measuring one or more of a decay rate or a waveform of the decay of the pressure.

18. A portable diagnostic system, comprising:
a controllable fuel provider device;
a fuel tank containing a fluid; and
a controller comprising one or more processors configured to control operation of the controllable fuel provider device via an energizer, the controllable fuel provider device configured to control flow of the fluid between the fuel tank and a vehicle fuel system via one or more fuel type connections to pressurize the vehicle fuel system,
the controller configured to monitor decay of pressure of the fuel system following pressurization of the fuel system of the vehicle, the controller configured to detect a fault of the fuel system of the vehicle based at least in part on the decay of pressure that is monitored.

19. The portable diagnostic system of claim 18, wherein the fluid contained within the fuel tank is hydrogen.

20. The portable diagnostic system of claim 18, wherein the control device is configured to communicate an alert responsive to detecting the fault of the fuel system.

* * * * *